United States Patent
Brendel et al.

[15] 3,692,847
[45] Sept. 19, 1972

[54] BRANCHED CHAIN ALKENOLS

[72] Inventors: Gottfired J. Brendel, Baton Rouge, La. 70808; Lawrence H. Shepherd, Jr., Baton Rouge, La. 70815

[73] Assignee: Ethyl Corporation, New York, N.Y.

[22] Filed: Oct. 5, 1970

[21] Appl. No.: 78,213

Related U.S. Application Data

[62] Division of Ser. No. 771,651, Oct. 29, 1968, Pat. No. 3,631,065.

[52] U.S. Cl. ................260/633, 252/522, 260/999
[51] Int. Cl. .............................................C07c 31/34
[58] Field of Search.....................................260/633

[56] References Cited

OTHER PUBLICATIONS

Shchelkunov et al., Chem. Abst. 70, 366gf, 1969

*Primary Examiner*—Howard T. Mars
*Attorney*—Donald L. Johnson

[57] ABSTRACT

Nonionic compounds in which an aluminum atom is part of an olefinically unsaturated ring system are prepared by causing interaction among aluminum, a conjugated diene and a hydrocarbon aluminum hydride in the presence of a suitable Lewis base such as 1,4-dioxane or N-methyl pyrrolidine. The resulting cyclic organoaluminum compound is useful in the synthesis of olefins and branched chain alkenols. Thus by subjecting the cyclic organoaluminum compound to hydrolysis, one or more olefins may be produced. To prepare branched chain alkenols, the cyclic organoaluminum compound is reacted with a cleavable cycloparaffinic monoether having a 3, 4 or 5 membered ring. Thereupon the reaction mixture is subjected to hydrolysis. The following novel compounds were prepared by this procedure:

1-chloromethyl-3,4-dimethyl-4-penten-1-ol
1-chloromethyl-3,3-dimethyl-4-penten-1-ol
2,2-bis(chloromethyl)-4,5-dimethyl-5-hexen-1-ol
2,2-bis(chloromethyl)-4,4-dimethyl-5-hexen-1-ol
1,5,5-trimethyl-6-hepten-1-ol
1,5,6-trimethyl-6-hepten-1-ol
4,5,6-trimethyl-6-hepten-1-ol
2,2,3-trimethyl-5,5-bis(chloromethyl)tetrahydropyran

2 Claims, No Drawings

BRANCHED CHAIN ALKENOLS

This application is a division of application Ser. No. 771,651, filed Oct. 29, 1968, now U.S. Pat. No. 3,631,065.

This invention relates to cyclic organoaluminum compounds, their synthesis and their use in the synthesis of olefins and branched chain alkenols. More particularly, this invention relates to compounds in which an aluminum atom is part of an olefinically unsaturated ring system.

Lehmkuhl, Angew. Chem. International Edition 5, 663 (1966), indicates that reaction of butadiene with alkali metal in an ether in the presence of an amount of trimethylaluminum-ether adduct equivalent to the metal causes the formation of the complex:

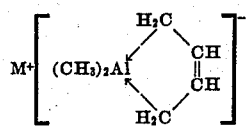

where M is lithium or sodium. This adduct is insoluble in aliphatic hydrocarbons and benzene. It decomposes above 150° C. without melting.

In copending application Ser. No. 748,613 filed July 30, 1968 one of us (GJB) has shown that aluminum-containing reaction products are prepared by effecting reaction at an elevated temperature in a system composed of aluminum, a cyclo-paraffinic monoether, a hydrocarbyl aluminum hydride and a diene. This is a complex condensation reaction which involves, in part, cleavage of the ring of the ether reactant. Hydrolysis of this aluminum-containing reaction product results in the liberation of branched chain alkenols.

The present invention involves, inter alia, the discovery that interaction may be caused among aluminum, a conjugated diene and a hydrocarbon aluminum hydride in the presence of certain Lewis bases to produce novel cyclic aluminum compounds which, unlike the adducts of Lehmkuhl, are nonionic. In conducting this reaction it is important to employ a Lewis base capable of complexing with the organoaluminum product without undergoing excessive cleavage. For best results the reaction is conducted in such Lewis bases as tertiary amines, dialkyl ethers, cycloparaffinic monoethers having a six membered ring, or cycloparaffinic diethers having a five or six membered ring.

The cyclic organoaluminum compounds produced in this process possess an aluminacycloalkene moiety. For example when 2,3-dimethyl butadiene in the diene employed in the process, the nonionic organoaluminum compound produced will contain the 3,4-dimethyl-aluminacyclopent-3-ene moiety:

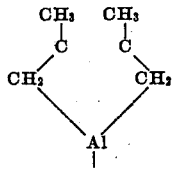

In other words two-thirds of a chemical equivalent of aluminum is directly involved in forming an olefinically unsaturated ring system.

The available experimental evidence tends strongly to indicate that the cyclic aluminum compounds of this invention exist in different molecular forms. By way of illustration, when the diene reactant in butadiene or butadiene substituted in the two position or in the two and three positions, the principal product produced is characterized by the formula:

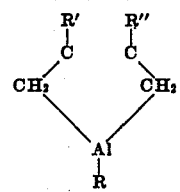

wherein R is a hydrocarbon group having up to about 18 carbon atoms; R' is a hydrogen, alkyl or alkenyl group; and R'' is a hydrogen or alkyl group.

In this preferred class of Compounds R corresponds to the hydrocarbon group initially present in the hydrocarbon aluminum hydride (most preferably a lower alkyl group).

On the other hand some of the product of the reaction appears to involve displacement of this R group and coupling of two aluminacycloalkene moieties via an alkenylene group. In this case the product (when employing butadiene or butadiene substituted on either or both of the internal carbon atoms) is characterized by the formula:

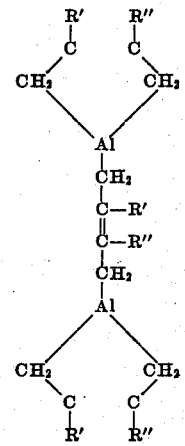

wherein R' is a hydrogen, alkyl or alkenyl group; and R'' is a hydrogen or alkyl group.

There is a marked tendency for the cyclic aluminum compounds of this invention to form complexes with Lewis bases such as tertiary amines, dialkyl ethers, cycloparaffinic monoethers having a six membered ring (e.g., tetrahydropyran) and cycloparaffinic diethers having a five or six membered ring (e.g., 1,4-dioxane). These complexes constitute preferred embodiments of this invention. Inasmuch as the cyclic aluminum compounds are nonionic, they are soluble in conventional aliphatic and aromatic hydrocarbon solvents, such as benzene.

The cyclic aluminum compounds of this invention may be readily hydrolyzed with water or with aqueous mineral acids or bases whereby olefins are produced. These olefins have the skeletal configurations of the hydrocarbon portion of the aluminacycloalkene moiety present in the nonionic organoaluminum compound being hydrolyzed. However the position of the double bond in the liberated olefin is dependent to some extent upon the hydrolysis conditions employed. It is possible, for example, to produce either alpha-olefins or olefins containing an internal double bond.

The cyclic aluminum compounds of this invention readily cleave cycloparaffinic monoethers having three or four membered rings. The resulting organoaluminum product on hydrolysis yields a branched chain alkenol whose carbon content corresponds to the sum of the carbon atoms of the diene used in forming the initial cyclic aluminum compound and of the cycloparaffinic monoether reacted therewith.

When the cyclic aluminum compounds of this invention are in admixture with cycloparaffinic monoethers having a five membered ring (e.g., tetrahydrofuran) there is also a marked tendency, especially at temperatures of about 150° C. and above, for this same type of cleavage-condensation reaction to occur. Hydrolysis of the resulting aluminum-containing intermediate results in the formation of a branched chain alkenol having more carbon atoms than the diene from which the cyclic aluminum compound had been formed, the increase in carbon atoms corresponding to the number of carbon atoms present in the cyclic monoether. However it is possible to maintain the nonionic cyclic aluminum compounds of this invention in contact with tetrahydrofuran and ring alkylated derivatives thereof without excessive ring cleavage occurring provided that the temperature is kept low enough.

In order to still further appreciate the practice and advantages of this invention reference should be had to the following illustrative examples.

EXAMPLE I

1-Isobutyl-3-methyl-aluminacyclopent-3-ene diethyl etherate

Activated aluminum metal (367 m moles), diethyl ether (1.23 moles), isoprene (150 m moles) and diisobutyl aluminum hydride (24 m moles) were brought together and heated at 145°–155° C. for three hours. The unreacted aluminum metal was recovered by filtration. It was thereby established that 62 m moles of the aluminum metal had participated in the reaction. Hydrolysis of a portion of the liquid reaction mixture with water followed by aqueous HCl at 0° to 25° C. resulted in the liberation of isobutane, isopentene and a small quantity of two unsaturated $C_7$ hydrocarbons. Analysis of the isolated $C_7$ hydrocarbons indicated they had a molecular weight of 98 which corresponds to $C_7H_{14}$. This indicates that some portion of the diethyl ether was cleaved during the reaction and that the cleaved ether interacted with some of the isoprene or a derivative thereof thereby producing the $C_7$ hydrocarbon isomers. Deuterolysis of the liquid reaction mixture liberated isopentene, 90 percent of which was dideuterated. Material balance studies indicated that at least 75 percent of the aluminum which had reacted was present in the form of the 3-methyl-aluminacyclopent-3-ene moiety. In other words the diethyl ether was not excessively cleaved either during the reaction or by the nonionic cyclic organoaluminum compound produced.

Thus this reaction resulted in the formation, inter alia, of the compound:

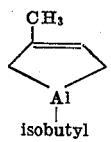

In a control experiment conducted under conditions similar to those described above, it was found that interaction between diisobutyl aluminum hydride and isoprene in diethyl ether (in the absence of aluminum metal) did not produce any compounds which give rise to appreciable amounts of dideuterated isopentenes on deuterolysis. Most of the isopentenes on deuterolysis of the reaction mixture were monodeuterated.

EXAMPLE II

1-Isobutyl-3-methyl-aluminacyclopent-3-ene tetrahydropyranate

The reaction of aluminum powder (365 m moles), isoprene (150 m moles), and diisobutyl aluminum hydride (24 m moles) in tetrahydropyran (1.23 moles) for two hours at 145°–150° C. resulted in the consumption of 35 m moles of the aluminum powder. Hydrolysis of a portion of the reaction mixture revealed that 61 m moles of isopentenes would be evolved on hydrolysis of the entire mixture. Deuterolysis experiments showed that the isopentenes liberated were at least 80 percent dideuterated which means that 49 m moles of the isopentenes were dideuterated or 93 percent of the aluminum which reacted went directly to form the 3-methyl-aluminacyclopent-3-ene moiety. It was established that very little, if any, of the tetrahydropyran was cleaved. Thus in this reaction the principal product formed in the reaction was:

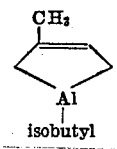

EXAMPLE III

1-Isobutyl-3-methyl-aluminacyclopent-3-ene N-methylpyrrolidinate

N-methylpyrrolidine (1.23 moles), aluminum metal (361 m moles), isoprene (150 m moles) and diisobutyl aluminum hydride (23 m moles) were allowed to react at 150° C. for two hours. This resulted in 36 m moles of the aluminum metal being solubilized. Deuterolysis of the reaction mixture with $D_2SO_4/D_2O$ liberated, in addition to monodeuterated isopentane, 61 m moles of isopentenes, 83 percent of which were dideuterated. Consequently all of the aluminum which participated in the reaction was converted to the 3-methyl-aluminacyclopent-3-ene moiety. Little or no cleavage of the cyclic amine occurred. Accordingly this reaction resulted in the formation in good yield of the compound:

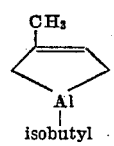

EXAMPLE IV

1-Isobutyl-3-methyl-aluminacyclopent-3-ene dioxanate

Reaction of aluminum metal (365 m moles), isoprene (150 m moles), diisobutyl aluminum hydride (31 m moles) in 1,4-dioxane (1.23 moles) at 150° C. for two hours resulted in solubilizing 71 m moles of aluminum metal. Deuterolysis of the product liberated 117 m moles of isopentenes, 107 m moles of which was dideuterated. Consequently almost all of the aluminum which entered into the reaction was converted into the 3-methyl-aluminacyclopent-3-ene moiety. Very little, if any, cleavage of the dioxane solvent occurred.

A portion of the liquid reaction product was concentrated by vacuum removal of some of the dioxane solvent. The nuclear magnetic resonance spectrum of the concentrated sample showed the presence of isobutyl aluminum groups. This was further corroborative evidence that the reaction resulted principally in the formation of the compound:

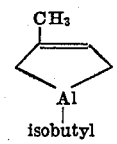

EXAMPLE V

1-Isobutyl-3-ethyl-aluminacyclopent-3-ene dioxanate

Powdered aluminum metal (365 m moles), 2-ethylbutadiene (150 m moles), and diisobutyl aluminum hydride (30 m moles) were caused to react in 1,4-dioxane (1.23 moles) at 145°–150° C. for two hours. A portion of the resulting liquid reaction product was subjected to hydrolysis using water followed by aqueous HCl at 25° C. This resulted in the liberation of 3-methylpentene-1, 2-ethylbutene-1 and trans-3-methylpentene-2. The identities of these $C_6$ hydrocarbons were established by comparing the VPC retention times and nuclear magnetic resonance spectra of these compounds with those obtained on authentic samples of the known compounds. No cis-methylpentene-2 was detected in the liberated mixture of $C_6$ hydrocarbons. Another portion of the liquid reaction product was diluted in the dimethyl ether of diethylene glycol and the temperature of the system was reduced to −80° C. Thereupon deuterolysis was effected using $NaOD/D_2O$ while allowing the system to reach room temperature. Analysis of the liberated $C_6$ olefins showed that the mixture was composed of 50 percent trans-3-methylpentene-2, 44 percent 2-ethylbutene-1, and 6 percent 3-methylpentene-1. The trans-3-methylpentene-2 isomer was separated from the other isomers and isolated using preparative VPC methods. Mass spectrographic analysis showed this compound to be 95 percent dideuterated. The nuclear magnetic resonance spectrum of the purified dideuterated trans-3-methylpentene-2 showed that one deuterium atom was located in each of the cis-methyl groups:

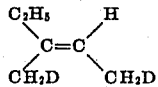

Consequently the original reaction product contained the 3-ethyl-aluminacyclopent-3-ene moiety as the compound:

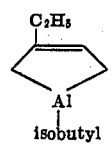

Hydrolysis or deuterolysis of other portions of the reaction product under differing conditions showed that it was possible to alter the distribution of the $C_6$ olefins liberated. For example hydrolysis using dilute aqueous HCl at 0°–5° C. yielded 3 percent trans-3-methylpentene-2, 83 percent 2-ethylbutene-1, and 14 percent 3-methylpentene-1. On the other hand, when deuterolysis was effected at 0°C. using $NaOD/D_2O$ the distribution of the deuterated isomers was 12 percent trans-3-methylpentene-2, 77 percent 2-ethylbutene-1 and 11 percent 3-methylpentene-1.

EXAMPLE VI

1-Isobutyl-aluminacyclopent-3-ene dioxanate

When 274 m moles of butadiene, 365 m moles aluminum metal, 1.23 moles 1,4-dioxane and 31 m moles diisobutyl aluminum hydride were heated for six hours at 150° C., a solid reaction product was obtained on cooling to room temperature. Deuterolysis of a portion of the reaction mixture liberated butene-1. A calculation indicated that hydrolysis of the entire reaction product would have liberated 202 m moles of butene which is equivalent to 74 percent of the butadiene initially added. Mass spectrographic analysis showed the butene to be dideuterated to the extent of 97 percent indicating a good conversion of the butadiene to the aluminacyclo-pent-3-ene moiety as the compound:

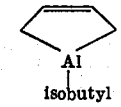

In like manner, reaction among powdered aluminum, myrcene and diisobutyl aluminum hydride in excess 1,4-dioxane solvent at 150° C. results in the formation of 1-isobutyl-3-(4-methyl-3-pentenyl)-aluminacyclopent-3-ene:

Similarly, reaction at 150°C. in 1,4-dioxane among aluminum, isoprene, and diethylaluminum hydride produces 1-ethyl-3-methyl-auminacyclopent-3-ene:

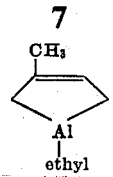

Substitution of diphenylaluminum hydride for the diethylaluminum hydride gives rise to the production of the corresponding 1-phenyl compound.

EXAMPLE VII

Reaction of 1-isobutyl-3-methyl-aluminacyclopent-3-ene with tetrahydrofuran

A system composed of activated aluminum powder (365 m moles), isoprene (150 m moles), diisobutyl aluminum hydride (31 m moles) and diethyl ether (1.23 moles) was heated to 145°–150° C. for two hours. The resulting diethyl ether complex of 1-isobutyl-3-methyl-aluminacyclopent-3-ene was separated from the unreacted aluminum metal. Excess diethyl ether was removed by distillation and the residue dissolved in tetrahydrofuran. The resulting tetrahydrofuran solution of the cyclic aluminum compound was heated at 150° C. for two hours. The reaction mixture was then subjected to hydrolysis and this resulted in the liberation of the $C_9$ alkenols 5,6-dimethyl-6-hepten-1-ol and 5,5-dimethyl-6-hepten-1-ol in a ratio of approximately 80:20, respectively. Consequently under proper reaction conditions the cyclic aluminum compounds of this invention will cleave tetrahydrofuran and make possible the preparation of branched chain alkenols (cf. Example I of Ser. No. 748,613).

EXAMPLE VIII

Reaction of 1-isobutyl-3-methyl-aluminacyclopent-3-ene with epichlorohydrin

1-Isobutyl-3-methyl-aluminacyclopent-3-ene was prepared by reacting activated aluminum powder with isoprene and diisobutyl aluminum hydride in excess 1,4-dioxane at 150° C. for two hours. The unreacted aluminum metal was removed by filtration of the liquid reaction mixture. To 43 m moles of the 1-isobutyl-3-methyl-aluminacyclopent-3-ene contained in 30 milliliters 1,4-dioxane was slowly added 6 milliliters (78 m moles) of epichlorohydrin. An exothermic reaction occurred. Then the reaction mixture was diluted with diethyl ether and the mixture hydrolyzed with dilute aqueous HCl. Excess reaction solvent was removed under vacuum and the product was distilled. The main fraction boiled at 65°–66° C. at 1.8 mm Hg. Analysis of this fraction by nuclear magnetic resonance and vapor phase chromatography showed this product to be a mixture of 1-chloromethyl-3,4-dimethyl-4-penten-1-ol and 1-chloromethyl-3,3-dimethyl-4-penten-1-ol, the former isomer predominating by about 9:1.

EXAMPLE IX

Reaction of 1-isobutyl-3-methyl-aluminacyclopent-3-ene with bis(chloromethyl)-oxetane Another portion of the dioxane solution of 1-isobutyl-3-methyl-aluminacyclopent-3-ene of Example VIII (21 m moles) was reacted with 4.1 grams (26.5 m moles) of bis(chloromethyl)-oxetane for three hours at 150° C. After hydrolysis of the reaction product, distillation resulted in the isolation of 4.8 grams of a liquid boiling over a wide range, 60° C. at 1.5 mm Hg to 134° C. at 7 mm Hg. Redistillation resulted in the isolation at 128°–144° C. and 9 mm Hg of 2,2-bis(chloromethyl)-4,5-dimethyl-5-hexen-1-ol, 2,2,3-trimethyl-5,5-bis(chloromethyl)tetrahydropyran and 2,2-bis(chloromethyl)-4,4-dimethyl-5-hexen-1-ol.

EXAMPLE X

Reaction of 1-isobutyl-3-methyl-aluminacyclopent-3-ene with 2-methyl-tetrahydrofuran A dioxane solution of 1-isobutyl-3-methyl-aluminacyclopent-3-ene was reacted with an excess of 2-methyl-tetrahydrofuran for four hours at 150° C. After hydrolysis of the reaction product, it was found to contain 1,5,5-trimethyl-6-hepten-1-ol, 1,5,6-trimethyl-6-hepten-1-ol, 1,5,6-trimethyl-5-hepten-1-ol and 4,5,6-trimethyl-6-heptene-1-ol. The relative amounts of these compounds as produced were approximately 37%:49%:%:11%, respectively. The 5-heptene compound evidently resulted from isomerization of the corresponding 6-heptene compound during work up.

It will be seen from the foregoing examples that the present invention may be successfully applied to a wide variety of suitable reactants. Thus the diene reactant, which preferably is a conjugated diene hydrocarbon, has four to about 18 carbon atoms in the molecule, and is exemplified by such substances as butadiene, isoprene, 2,3-dimethyl butadiene, 2-ethyl butadiene, myrcene, 1,4-dimethyl butadiene, 1,4-diphenyl butadiene, 2-phenyl butadiene, alpha-phellandrene, and the like. Also the diene may be substituted by innocuous radicals as in the case of chloroprene and 2,3-dichlorobutadiene. Dienes wherein the double bonds are in the terminal positions are usually most suitable.

The hydrocarbon aluminum hydride reactant used in the process may be a dihydrocarbyl aluminum hydride ($R_2AlH$) in which the R groups are hydrocarbyl groups (alkyl, aryl, cycloalkyl, alkenyl, aralkyl, alkaryl, etc.).

Thus use may be made of such compounds as dimethylaluminum hydride, diethylaluminum hydride, dipropylaluminum hydride, dibutylaluminum hydride, diisobutylaluminum hydride, dioctylaluminum hydride, dioctadecylaluminum hydride, diphenylaluminum hydride, ditolylaluminum hydride, dicumenylaluminum hydride, dicyclohexyl-aluminum hydride, dimethylcyclohexyl aluminum hydride, diallylaluminum hydride, dibenzylaluminum hydride, diphenethyl-aluminum hydride and the like. It is generally preferable to utilize a dialkylaluminum hydride, especially those having alkyl groups containing up to about 18 carbon atoms. The most preferred compounds are the dialkyl aluminum hydrides in which each alkyl group is a lower alkyl group and thus contains up to about six carbon atoms. If desired, the hydrocarbon aluminum hydride may be generated in situ by initially reacting aluminum with trihydrocarbyl aluminum (e.g. triethylaluminum) under a hydrogen atmosphere according to known technology.

The aluminum used in the process of this invention may be in the form of chips, turnings, powder, or other similar particulated states. It is definitely preferable to employ activated aluminum. Methods for producing activated aluminum are standard and well known in the art. For further details, reference may be had, for example, to U.S. Pat. Nos. 2,885,314; 2,892,738; 2,921,876; 3,100,786 and 3,104,252.

As noted above, reaction is conducted in the presence of a Lewis base having suitable chemical stability under the reaction conditions being utilized. In most cases this Lewis base will be employed as the principal reaction solvent--i.e., the reaction will be conducted in the Lewis base selected for use. However if desired the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a suitable amount of the Lewis base is also present in the reaction system. Ordinarily the system should contain at least 1-2 mols of Lewis base per mol of diene employed. Particularly convenient Lewis bases for use in the process are tertiary amines (e.g., trimethyl amine, dimethyl-ethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclidine, and the like); dialkyl ethers (e.g., dimethyl ether, diethyl ether, diisopropyl ether, methylisoamyl ether, dibutyl ether, dihexyl ether and the like); cycloparaffinic monoethers having a six membered ring (e.g., tetrahydropyran--pentamethylene oxide--and ring alkylated derivatives thereof); and cycloparaffinic diethers having a five or six membered ring (e.g., 1,4-dioxane, 1,3-dioxolane, 2-methyl-2-ethyl-1,3-dioxolane; and the like); and other similar substances which tend not to be excessively cleaved in the reaction, such as dicyclohexyl ether, dibenzyl ether, and the like. The relative proportions of the reactants and reaction diluents do not appear to be critical as long as there is present a sufficient amount of each reactant to participate in the reaction.

In conducting the process for forming the cyclic organoaluminum compounds of this invention, elevated temperatures are employed. Generally, temperatures within the range of about 100° C. to about 180° C. will be found satisfactory, temperatures within the range of about 130° to about 150° C. being preferred.

Ordinarily the reaction will be conducted at atmospheric pressure or at the ambient pressures encountered when conducting the reaction in a closed reaction vessel. However when using some of the lower boiling Lewis base solvents, e.g., dimethyl ether, trimethyl amine or the like, it is desirable to conduct the reaction at a high enough pressure to keep the system in the liquid state of aggregation. Thus pressures up to about 50 atmospheres may be employed.

It will of course be understood that the reaction mixture should be kept essentially anhydrous and that exposure of the reaction system to air should be kept at a minimum.

The period of time during which the reactants interact with each other is susceptible to considerable variation and is generally discretionary. In general, the higher the reaction temperature, the shorter the reaction or contact time.

The procedures of above Examples VIII-X, inclusive, gave rise to the production of novel compounds, one a cyclic ether and the remainder a group of alkenols. All of these compounds have special fragrance characteristics and thus are of utility as perfumes, especially in connection with household detergents, shampoos, toilet bars and the like. The alkenols are of particular utility as chemical intermediates inasmuch as they have an olefinic double bond near one end of the molecule and a hydroxyl group at or near the other end. Thus either or both of these reaction sites may be utilized in chemical synthesis. In the case of the chlorinated alkenols, each chlorine atom present provides still another focal point of chemical reactivity. The cyclic ether is also suitable for use as a solvent. Other utilities for these compounds include their use as germicides, insecticides, fungicides, insect repellants, monomers, and surface active agents.

What is claimed is:

1. A compound selected from the group consisting of:

2,2-bis(chloromethyl)-4,5-dimethyl-5-hexen-1-ol
2,2-bis(chloromethyl)-4,4-dimethyl-5-hexen-1-ol
2. 2,2-Bis(chloromethyl)-4,5-dimethyl-5-hexen-1-ol.

* * * * *

PO-1050
(5/69)

UNITED STATES PATENT OFFICE
CERTIFICATE OF CORRECTION

Patent No. 3,692,847      Dated September 19, 1972

Inventor(s) Gottfried J. Brendel and Lawrence H. Shepherd, Jr.

It is certified that error appears in the above-identified patent and that said Letters Patent are hereby corrected as shown below:

Column 1, line 50, "in the" should read -- is the --;
line 55 (in the formula), "C    C" should read -- C = C --;
line 67, "reactant in" should read -- reactant is --. Column 2,
line 4 (in the formula), "C    C" should read -- C = C --;
line 26 (in the formula), "C    C" should read -- C = C --;
line 39 (in the formula), "C    C" should read -- C = C --.
Column 8, line 21, "trimethyl-6-heptene-1-ol" should
read -- trimethyl-6-hepten-1-ol --; line 24, "37%:49%:%:11%"
should read -- 37%:49%:3%:11% --.

Signed and sealed this 13th day of February 1973.

(SEAL)
Attest:

EDWARD M. FLETCHER, JR.
Attesting Officer

ROBERT GOTTSCHALK
Commissioner of Patents